United States Patent [19]

Moen et al.

[11] Patent Number: 4,575,443
[45] Date of Patent: Mar. 11, 1986

[54] ROTARY INJECTION MOLDING SYSTEM FOR SUPPRESSING POLYMER FLASH

[75] Inventors: Bruce A. Moen, Golden; Roger A. Hahn, Arvada, both of Colo.

[73] Assignee: Adolph Coors Company, Golden, Colo.

[21] Appl. No.: 684,673

[22] Filed: Dec. 21, 1984

[51] Int. Cl.⁴ .......................... B29C 17/12; B29D 7/10
[52] U.S. Cl. ..................................... 264/161; 264/312; 425/215; 425/556; 425/806; 425/426; 425/435; 425/567; 249/144
[58] Field of Search ............... 264/161, 312; 425/215, 425/426, 435, 556, 567, 806; 249/144

[56] References Cited

U.S. PATENT DOCUMENTS

| | | | |
|---|---|---|---|
| 3,307,726 | 3/1967 | Cleerman | 264/312 X |
| 3,371,387 | 3/1968 | Cleerman et al. | 425/590 |
| 3,389,434 | 6/1968 | Cleerman et al. | 425/556 X |
| 3,500,503 | 3/1970 | Cleerman et al. | 425/567 X |
| 3,892,828 | 7/1975 | Weatherly et al. | 264/161 X |
| 4,083,568 | 4/1978 | Lane et al. | 425/426 X |
| 4,361,531 | 11/1982 | Black | 264/161 |
| 4,380,423 | 4/1983 | Aoki | 264/161 X |
| 4,445,406 | 5/1984 | Thatcher | 264/161 X |
| 4,449,913 | 5/1984 | Krishnakumars et al. | 264/161 X |

Primary Examiner—J. Howard Flint, Jr.
Attorney, Agent, or Firm—Klaas & Law

[57] ABSTRACT

A device and method for flash suppression in a molding with rotation system having a non-rotating mating surface capable of venting gases during the molding process while simultaneously suppressing flash. Flash is directed inwardly and away from the mating surface and contained between a mandrel and mandrel housing in a low pressure reservoir which is completely separate from the mating surface. A cooling fluid is utilized to carry away flash particles from the low pressure reservoir and thereby further prevent contamination of the mating surface.

39 Claims, 11 Drawing Figures

ROTARY INJECTION MOLDING SYSTEM FOR SUPPRESSING POLYMER FLASH

BACKGROUND OF THE INVENTION

This invention pertains generally to rotary injection molding systems performing plastic parison preforms and more particularly to rotary injection molding systems for forming plastic parison preforms which are capable of suppressing flash.

In conventional non-rotating injection molding processes, a plastic parison, or preform is formed between a mandrel, or core pin and a molding cavity. The parison, or preform, is later blow molded into a finished article or reform. To form a mold, elements of the mold must be joined to form an enclosure. Assembly of the elements of the enclosure result in the formation of a mating interface which is the boundary between the surfaces of the elements of the enclosure which mate with one another to form the enclosed cavity.

In conventional non-rotating injection molding systems, the mating interface is formed by the mating surfaces of the mandrel and molding cavity, which abut with one another when they are joined to form the enclosure. The tolerances of the mating surfaces of the non-rotating injection molding systems can be made sufficiently precise, i.e., a gap space on the order of 0.0005 to 0.001 inches, to allow venting of mold gases while simultaneously suppressing the flow of polymer material (flash) in the mating interface. Gas venting and suppression of flash is achieved in non-rotating injection molding systems for injection pressures of polymer on the order of 20,000 psi. Since the mating surfaces of the molding cavity and mandrel are static, a seal can be provided by producing a clamping force which is greater than the force exerted by the plastic on the mating surfaces during the injection cycle. Mating surfaces are maintained in a sealed position until the plastic is solidified so as to prevent the flow of polymer onto the mating surfaces after disassembly.

However, in order to produce molded articles of greater strength, it is desirable to impart a preferred orientation to long chains of molecules in the polymer by rotating or oscillating the mandrel with respect to the mold cavity during the formation process, such as disclosed in U.S. Pat. No. 3,307,726, the disclosure of which is specifically incorporated herein by reference. While molding with rotation produces a superior molded article, complications arise in sealing a rotating mating interface to prevent the flow of flash material on the mating surfaces. Normal minimal tolerances which prevent the flow of flash material into the mating interface in a non-rotating objection molding machine are insufficient to suppress flash between rotating or oscillating mating surfaces due to shear heating of the polymer material by the moving surfaces which reduces polymer viscosity. Reduced polymer viscosity in the region of the mating interface causes the flow of flash material into the mating interface for mating surface tolerances normally utilized in non-rotating injection molding systems. Implementation of rotary molding machines in a high repetition automated rotary injection molding process has resulted in build-up of flash on the mating surfaces. As flash builds up on the mating surfaces, the tolerances of the mating interface go out of specification and the rotary molding machine must be shut down so that flash can be removed. Since clamp pressures imbed the flash material into the mating surface, scrapping is normally not effective to completely remove the flash material and flash material must consequently be removed using a solvent in a time consuming process of washing the mating surfaces. Flash problems have prevented implementation of the plastic rotary molding machine in a viable high speed, commercially valuable rotary molding process.

Attempts have been made to overcome the problems of flash deposited on the rotating mating interfaces, as disclosed in U.S. Pat. Nos. 3,371,387; 3,389,434; 3,500,503; and 4,083,568; the discloser of which is specifically incorporated herein by reference. In general, the above referenced patents attempt to overcome the problem of flash forming on rotating mating surfaces by providing a flash gap on the order of 0.0002 to 0.0005 inches, and a low pressure reservoir connected to the flash gap for containing flash material emitted by the flash gap. As shown in the above referenced patents, and especially U.S. Pat. No. 3,389,434, a flash gap is formed in the rotating interface between the mandrel end cavity mold directly adjacent the parison. Due to its precise dimensions, the flash gap functions as a seal which is capable of emitting flash into the low pressure reservoir during peak intervals which occur during the molding process. The reservoir operates to collect flash material produced between the rotating surfaces of the flash gap. Upon separation of the rotating mating surfaces, the flash particles are removed from the reservoir by the application of pressurized air. This process is intended to eliminate the need to shut down the machine to remove flash particles from the reservoir.

However, several problems exist in implementing the devices in the above referenced patents. For example, relatively high clamping pressures are still required on the rotating mating interface, even though a low pressure reservoir is utilized to prevent flash material from flowing into the mating interface. As a consequence of the high clamping pressures required between the rotating mating surfaces, the high tolerance required for the flash gap, i.e., 0.0002 to 0.0005 inches, are difficult to maintain due to the friction and consequent wear generated. Moreover, during the process of separation of the mandrel and molding cavity, flash particles removed from the reservoir by air pressure become airborne and deposit on the mating surfaces. Subsequent joining of the mating surfaces causes the previously airborne flash particles to embed in the mating interface requiring machine shutdown in the application of a solvent as disclosed above, to remove the embedded flash particles to maintain proper tolerances.

OBJECTS OF THE INVENTION

It is therefore an object of the present invention to provide an improved rotary molding system.

It is also an object of the present invention to provide a rotary molding system which can be utilized in an automated commercial injection molding process.

Another object of the present invention is to provide a device for flash suppression of a parison formed in a rotary molding machine.

Another object of the present invention is to provide a method of flash suppression in a rotary molding machine for forming a parison.

Another object of the present invention is to provide a rotary molding machine which essentially eliminates the flash between mating surfaces of a rotary molding machine.

Additional objects, advantages and novel features of the invention are set forth in part in the description which follows and will be understood by those skilled in the art upon examination of this application, or may be learned by practice of the invention. The objects and advantages of the invention may be realized and obtained by means of the instrumentalities and combinations particularly pointed out in the appended claims.

SUMMARY OF THE INVENTION

To achieve the foregoing and other objects and in accordance with the purposes of the present invention, as embodied and broadly described herein, the apparatus of this invention may comprise a device for suppression and removal of flash formed in a rotary molding machine comprising: a mandrel; a mandrel housing; a molding cavity adapted to abut against the mandrel housing to form a stationary mating interface capable of venting gases and suppressing flash from the parison; means for coupling the mandrel and the mandrel housing to provide for relative rotation between the mandrel and mandrel housing and to form a flash gap between the mandrel and the mandrel housing; reservoir means disposed between the mandrel and the mandrel housing means for containing flash emitted by the aid flash gap; means for removing flash from the reservoir means.

The present invention may also comprise a device for flash suppression of a parison formed in a rotary molding machine comprising a mandrel; a mandrel housing; means for coupling the mandrel and the mandrel housing to provide for relative rotation between the mandrel housing and the mandrel and to form a flash gap between said mandrel and the mandrel housing which is disposed radially inward from the parison; a molding cavity adapted to abut against the mandrel housing to form a stationary mating interface between the molding cavity and the mandrel housing, the stationary mating interface disposed radially outward from the parison and having machine gaps formed therein capable of venting gases and suppressing flash during molding; reservoir means disposed between the mandrel and the mandrel housing for containing flash emitted by the flash gap; cooling fluid means circulated under negative pressure in the reservoir means to solidify and carry away flash emitted from the flash gap to prevent the flash from depositing on the stationary mating interface.

The present invention may also comprise a device for suppression, collection and removal of flash formed in a rotary molding device comprising: a rotating mandrel; a housing; a molding cavity adapted to abut against the mandrel housing to form a stationary mating interface between the molding cavity and the mandrel housing, the mating interface disposed radially outward from the parison and having machined gaps to vent gas during molding; means for coupling the rotating mandrel and the mandrel housing to form a flash gap between the rotating mandrel and the mandrel housing, the flash gap disposed radially inward from the parison; reservoir means formed between the rotating mandrel and said mandrel housing, said reservoir means disposed radially inward from the parison and coupled to the flash gap such that flash emitted by the parison through the flash gap is directed away from the mating interface and enclosed between the rotating mandrel and the mandrel housing; cooling fluid means circulating in the reservoir means under negative pressure to solidify the flash emitted by the parison through the flash gap and carry away flash particles and other debris in said reservoir to prevent flash from depositing on the stationary mating interface; a flash cutter disposed in the reservoir for cutting the flash emitted through the flash gap into flash particles.

The present invention may also comprise a method of suppression and removal of flash in a rotary molding machine for forming a parison comprising the steps of: coupling a mandrel and a mandrel housing to form a flash gap and provide for relative rotation between a mandrel and a mandrel housing; providing a stationary mating interface between the mandrel housing and a molding cavity which is capable of venting gases and suppressing flash from the parison; containing flash emitted from the flash gap in a reservoir between the mandrel and the mandrel housing; removing flash contained in the reservoir using a fluid.

The present invention may also comprise a device for suppression of flash formed in a rotary molding machine comprising: a mandrel; a mandrel housing; a molding cavity adapted to abut against the mandrel housing to form a stationary mating interface capable of venting gases and suppressing flash from the parison; means for coupling the mandrel and the mandrel housing to provide for relative rotation between the mandrel and the mandrel housing and to form a flash gap between the mandrel and the mandrel housing; a reservoir disposed between the mandrel and the mandrel housing means and connected to the means for coupling; cooling fluid means circulated under negative pressure in the reservoir to solidify polymer in the flash gap to form a flash gap seal.

The advantages of the present invention are that the dimensions of the flash gap can be maintained with a high degree of accuracy since rotation is provided between the mandrel and mandrel housing so that a non-rotating mating interface can be provided between the mandrel and cavity mold which is capable of suppressing flash. Just as in the non-rotating molding process, the mating interface is also capable of venting gases during the molding process while suppressing flash from the parison.

While the mating interface is disposed radially outward from the parison, the flash gap is formed between the rotating mandrel and the mandrel housing and is disposed radially inward from the parison. Therefore, flash emitted by the flash gap is directed away from the stationary mating interface and deposited in a reservoir formed between the mandrel and mandrel housing. In this manner, flash particles are directed away from the mating interface and contained in a reservoir which is totally separate from the mating interface, thereby substantially reducing the possibility for contamination. Moreover, a cooling fluid is circulated under negative pressure, as disclosed in U.S. Pat. No. 4,091,069 which is incorporated herein by reference and forms a part of this disclosure for all that it teaches, to remove flash contained in the reservoir further reduces the possibility of contamination of the mating surfaces from airborne flash particles. Consequently, the present invention results in a system which substantially reduces the possibility of contamination from the flash and flash particles produced during the molding process of a rotary injection molding machine and thereby provides a commercially usable rotary injection molding system.

The thrust load on mandrel 26 due to injection pressure is sustained by thrust bearing 56, bearing race 54 and shim 52. The thrust load is transferred through integral bearing race in mandrel 26. Shimmed bearing 58 is used to preload thrust bearing 56. Radial bearings 64 and 66 maintain concentricity of mandrel 26 during rotation. The flash gap dimension, which is in the range of 0.0002 to 0.0005, is maintained by selection of the proper thickness of shim 52. Wear ring 70 on mandrel 26 provides a wear interface as protection for the gap interface on mandrel housing member 44. In the event that wear ring 70 touches mandrel housing member 44 while the mandrel 26 is rotating, damage to these close tolerance surfaces is minimized.

During peak pressure intervals in the molding process, polymer flashes through flash gap 32 and enters a reservoir 30 which is filled with a cooling fluid, such as water or a cooled gas. The cooling fluid is circulated under negative pressure to prevent leakage of the cooling fluid through flash gap 32 into the molding cavity. Contact with cooling fluid freezes off the polymer and stops the flow of flash through flash gap 32. Since repeated injection cycles may force more polymer through the flash gap 32, a stationary flash cutter 34 is provided. When the build-up of flash on rotating mandrel 26 contacts the flash cutter 34, the rotary motion of the mandrel 26 allows the blade to slice, shred and chip the flash into pieces small enough to be carried away by the cooling fluid. A strainer (not shown) in the fluid cooling circulation system removes flash pieces.

FIG. 2 shows an alternative manner of implementing the embodiment illustrated in FIG. 1. Element 72 comprises a split ring insert in mandrel housing member 44 which is held in position by pre-load thrust bearing 58 by application of pressure to bearing race 60 and shim 62. This design improves dimensional control of flash gap 32 and allows for an easier and less expensive replacement of the flash gap surface of split insert 72.

FIG. 4 illustrates another embodiment utilizing an axial flash gap wherein the final flash gap dimension is independent of tolerance build-up in bearings, races, etc. As in the embodiment of FIGS. 1 and 2, the flash gap dimension is determined by the axial location of the mandrel 26 and mandrel housing 24 relative to molding cavity 22. For this reason, the embodiments of FIGS. 1, 2 and 4 comprise axial flash gap embodiments.

As illustrated in FIG. 4, mandrel housing 24 comprises a mandrel housing block 74, mandrel housing plate 76, gap insert 78 and attaching means such as machine screw 80 and bolt 82. A mandrel plate 84 is attached to mandrel 26 by way of a split locking collar 86 which positions mandrel plate 84 axially on mandrel 26 by way of locking plate 88 which is attached to mandrel plate 84 using machine screw 90. Split locking collar 86 incorporates a key (not shown) and core pin keyway (not shown) to transmit torque from mandrel 26 to mandrel plate 84 and locking plate 88. Bearing race 92 is slip fit into housing plate 76 and secured to prevent rotation of bearing race 92 in housing plate 76 by way of pin 94. Spring washer 96 is disposed between bearing race 92 and housing plate 76. Roller thrust bearing 98 is disposed between bearing races 100 and 102. Bearing race 104 is press fit onto locking plate 88. Taper roller bearing 106 is disposed between bearing race 104 and bearing race 92. Radial bearing 108 maintains alignment of the core pin.

In operation, the embodiment of FIG. 4 provides a roller thrust bearing 98 which supports injection pressure load in a axial direction on mandrel 26. Taper roller bearing 106 maintains both axial and radial alignment of mandrel 26 during the application of pressure of the molding process. Spring washer 96 is used to pre-load thrust bearing 98 and taper roller bearing 106 to establish the dimension of flash gap 32. Spring washer 96 also prevents movement of mandrel 26 into the molding cavity 22 by maintaining sufficient pre-load force to resist the hydraulic force resulting from injection pressure. The flash gap dimension is determined by assembling the mandrel and mandrel housing to the molding cavity and fabricating the gap sizing insert 110 to provide the desired flash gap dimension. In this manner, final gap dimension of flash gap 32 is independent of tolerance build-up in the bearings, races, etc., since force applied to mandrel housing 24 is transmitted through thrust bearing 98 to spring washer 96 which determines the pressure on mandrel 26, independently of the pressure applied to mandrel housing 24. In other words, the pre-load pressure supplied by spring washer 96 determines the flash gap dimension independent of the pressure applied to mandrel housing 24.

FIG. 5 discloses an embodiment of the present invention employing a radial flash gap. As illustrated in FIG. 5, the mandrel housing comprises gap insert 112, mandrel plate 114, and mandrel housing block 116. These elements are secured together by bolt 118. Radial bearing 120, as well as bearing 132 disposed within bearing races 128 and 130, provide alignment of mandrel 26. Bearing 132 also aligns the mandrel 26 and mandrel housing 24, as well as thrust bearing 122 and associated bearing races 124 and 126. These elements comprise the means for coupling 28. A hole 138 in gap insert 112 transmits flash from low pressure reservoir 30 into secondary reservoir 140. Cutter blade 34 cuts flash transmitted through hole 138 into flash particles. Cooling fluid is passed through secondary low pressure reservoir 140 and low pressure reservoir 30 by way of fluid access passage 142. Seal 134 is provided to block the flow of cooling fluid into the means for coupling 28. Flash gap 32 is disposed in a radial direction between gap insert 112 and mandrel 26. The radial flash gap 32 provides a seal for flash which requires a less critical and more easily maintained flash gap dimension. Since flash gap 32 results from the radial dimensions of mandrel 26 and gap insert 112, the axial location of the mandrel 26 and gap insert 112 have no effect upon the flash gap dimension. This constitutes an important difference over the embodiments disclosed in FIGS. 1 and 2, since the structure required to maintain axial location and provide the tolerances to produce a flash gap in the range of 0.0002 to 0.0005 inches can be eliminated in a radial flash gap design, such as illustrated in FIG. 5.

In operation, mandrel 26 is inserted into molding cavity 22. Mandrel housing 24 and molding cavity 22 provide a stationary mating interface 40 which is capable of venting gases during the molding process while simultaneously suppressing flash. Flash is emitted from parison 38 through flash gap 32 into low pressure reservoir 30. A cooling fluid 36 is circulated under negative pressure and functions to cool and solidify the flash and carry away flash particles by way of fluid access passage 142. Flash which does not cool sufficiently and solidify is emitted through hole 138 and cut into flash pieces by cutting blade 34. The sheared-off polymer flash pieces are carried away by the cooling fluid 36.

FIG. 3 discloses another embodiment employing a radial flash gap. Mandrel housing 24 comprises a gap

BRIEF DESCRIPTION OF THE DRAWINGS

An illustrative and presently preferred embodiment of the invention is shown in the accompanying drawings wherein.

DETAILED DESCRIPTION OF THE INVENTION

Figure 1:
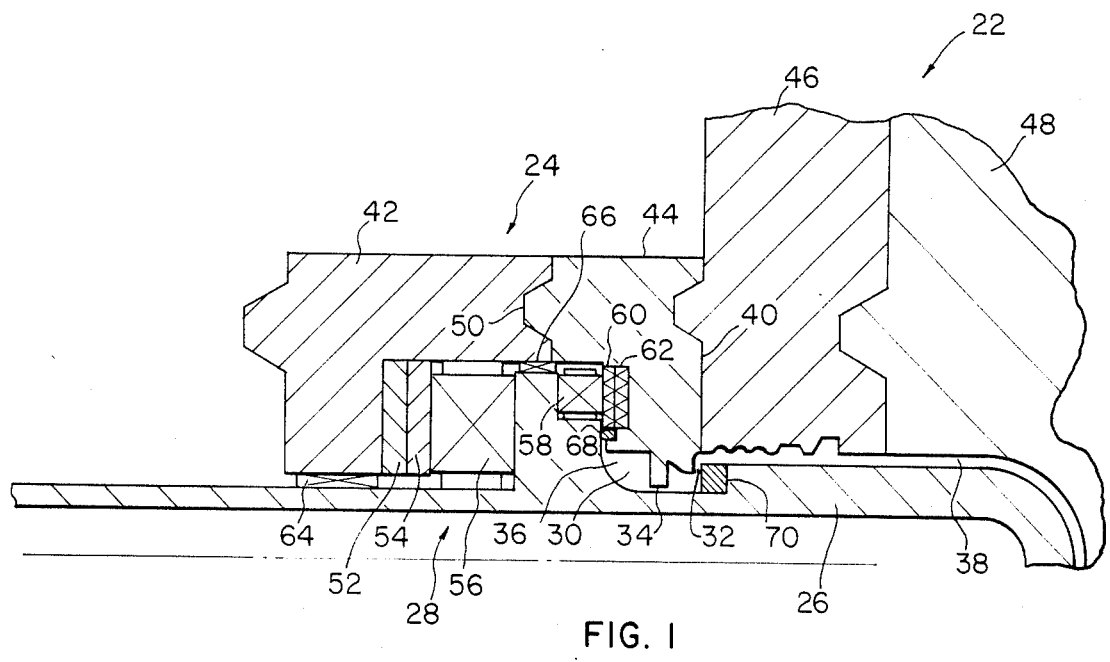
FIG. 1 is a schematic cross-sectional diagram of an embodiment of the present invention having an axial flash gap.
Figure 3:
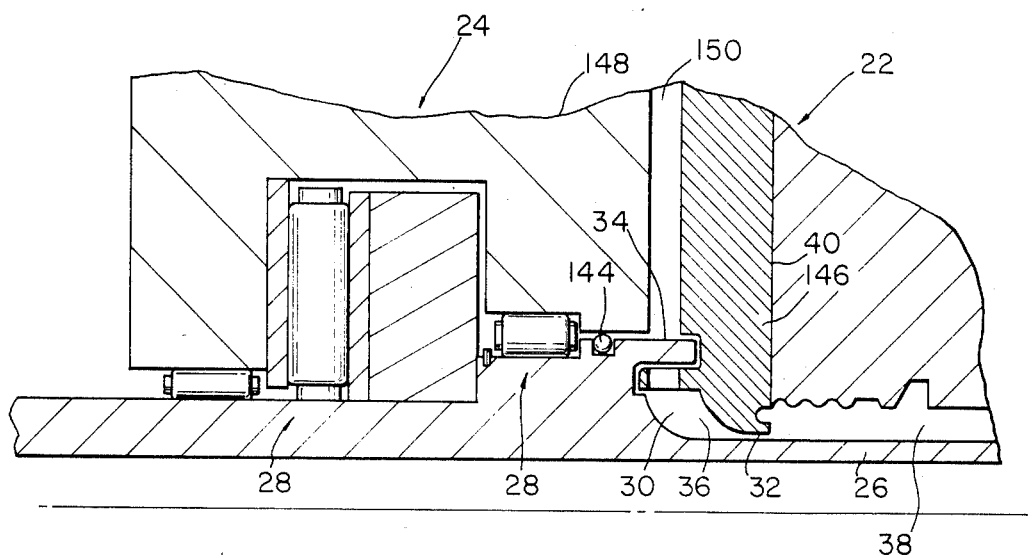
FIG. 3 is a schematic cross-sectional diagram of another embodiment of the present invention employing a radial flash gap.
Figure 2:
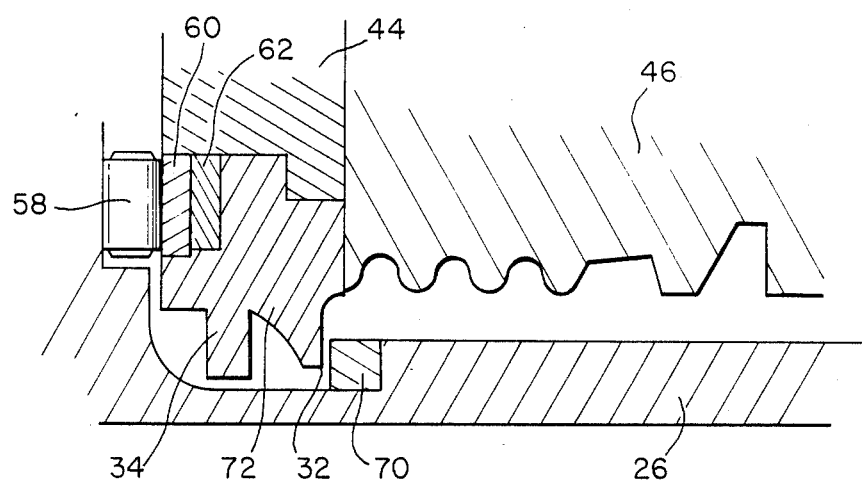
FIG. 2 is a schematic cross-sectional diagram to an alternative embodiment for implementing the embodiment of FIG. 1.
Figure 4:
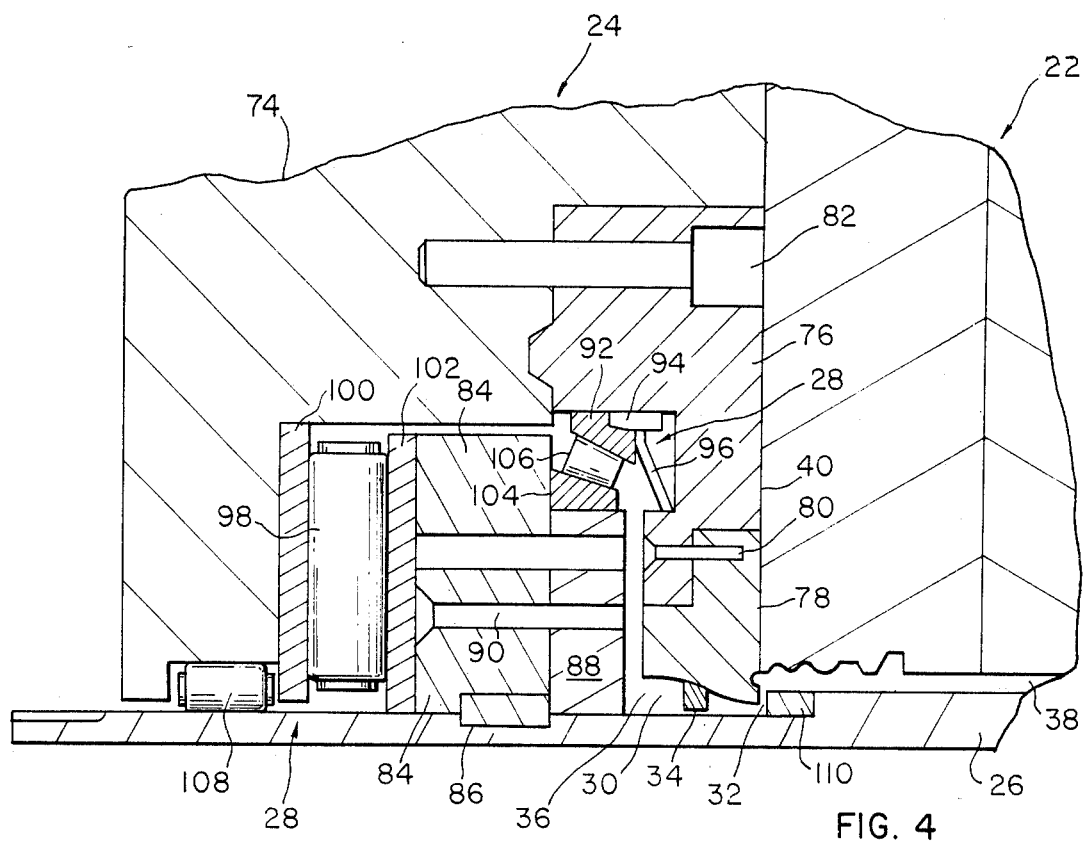
FIG. 4 is a schematic cross-sectional diagram of another embodiment of the present invention employing an axial flash gap.
Figure 5:
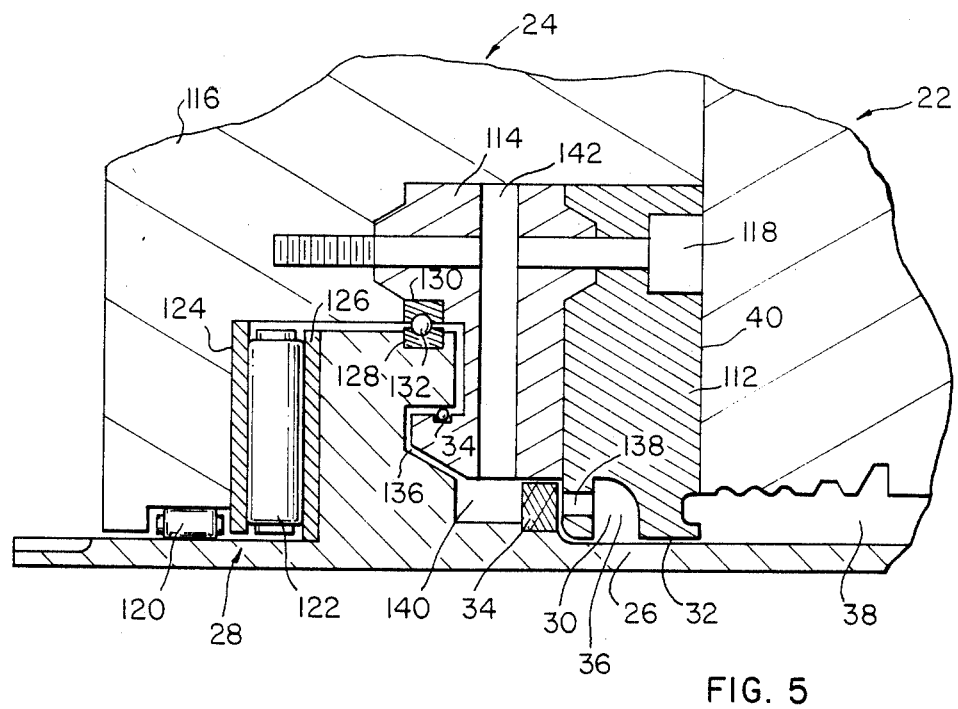
FIG. 5 is a schematic cross-sectional diagram of another embodiment of the present invention employing a radial flash gap.

As illustrated in the various figures, the present invention generally comprises a system for flash suppression of a parison formed in a rotary molding machine having a molding cavity 22 which is adapted to abut against a mandrel housing 24 to form a stationary mating interface which is capable of venting gases and suppressing flash from a parison 38. Means for coupling 28 are provided for coupling the mandrel 26 to mandrel housing 24 to provide for relative rotation between mandrel 26 and mandrel housing 24 and to form a flash gap 32 between the mandrel 26 and the mandrel housing 24. The flash gap 32 is disposed radially inward from the stationary mating interface 40 and directs flash emitted by parison 38 in a direction away from mating interface 40. A reservoir means 30 is formed between mandrel 26 and mandrel housing 24. In several of the embodiments disclosed, the reservoir means is disposed radially inward from the parison and is coupled to the flash gap such that flash emitted by the parison through the flash gap is directed away from the mating interface and enclosed between the rotating mandrel and mandrel housing, which is totally separate from the mating interface 40 so as to substantially reduce the possibility for contamination of the mating interface 40. Cooling fluid means 36 is circulated under negative pressure in reservoir means 30 and operates to cool and solidify flash emitted from flash gap 32. Cooling fluid means 36 is circulated and filtered to carry away flash particles and any other debris which may accumulate in reservoir 30. Flash cutter means 34 is disposed in reservoir 30 and functions to cut flash emitted by flash gap 32 into flash particles.

In operation, mandrel 26 is placed in molding cavity 22 such that mandrel housing 24 and molding cavity 22 provide a stationary mating interface 40. A polymer is injected through an orifice (not shown) in molding cavity 22 at very high pressures and temperatures to form a parison 38. Mandrel 26 is rotated by way of means for coupling 28 to impart a preferred orientation to long chains of molecules in the polymer during molding. This produces a molded article of greater strength. During the injection molding process, flash is emitted through flash gap 32 into a reservoir 30. A flash cutter 34 cuts the flash into flash particles which are stored in a reservoir 30 and carried away by cooling fluid means 36. Cooling fluid means 36 also functions to cool and solidify the flash emitted by flash gap 32. Since the mating interface 40 is stationary, it is capable of venting gases during the molding process while suppressing flash from the parison. This was not achievable in prior art molding with rotation systems having a rotating mating interface.

Referring to FIG. 1, an embodiment is illustrated which employs an axial flash gap. The mandrel housing 24 comprises housing members 42 and 44 which are attached. Mandrel housing member 44 is constructed in standard split ring fashion and secured directly to mandrel housing member 42 by way of an alignment taper 50. Means for coupling the mandrel housing means 24 to mandrel 26 comprise elements 52, 54, 56, 58, 60 and 62. Elements 52 and 62 comprise shims which are fabricated in incremental thicknesses to adjust the flash gap spacing 32. Elements 54 and 60 comprise bearing races for thrust bearing 56 and thrust bearing 58. Thrust bearing 56 which may comprise a taper roller, functions to support the thrust load due to injection pressure in the molding cavity. Thrust bearing 58 provides a pre-load on thrust bearing 56 by proper selection of shim 62. Radial bearings 64 and 66 center the mandrel 26 in mandrel housing means 24. If thrust bearings 56 and 58 constitute taper rollers, radial bearing 64 and 66 may be eliminated. Water seal 68 may comprise an O-ring type seal or a face type seal. Flash cutter 34 may form a part of mandrel housing 44 or may constitute cutter blades which are an insert in mandrel housing member 44. Wear ring 70 can comprise a carbide or ferrus type metal which is brazed to mandrel 26. Molding cavity 22 comprises a neck ring 46 attached to injection cavity 48. Neck ring 46 provides a stationary mating interface 40 with mandrel housing 44. Neck ring 46 forms the threads on parison 38 and is used to strip the finished parison from mandrel 26. Cooling fluid means 36 is circulated in reservoir means 30 to remove flash particles. Flash gap 32 is formed between wear ring 70, which is mounted on the rotating mandrel 26, and the stationary mandrel housing member 44.

In operation, polymer is injected into the space between injection cavity 48 and mandrel 26. Trapped air and gases vent out through thin gaps machined in neck ring 46 on mating interface 40. Since mating interface 40 is non-rotating or stationary, i.e., mandrel housing member 44 and neck ring 46 are in a stationary relationship to one another, the vent gaps machined in neck ring 40 do not flash. Similar mating surfaces between members having relative rotation with one another have been found to produce flash, as set forth in the prior art.

insert 146 and mandrel housing block 148 with a fluid access passage 150 disposed therein. Seal 144 provides a water seal between the fluid access passage 150 and means for coupling 128.

In operation, flash passes through flash gap 32 into reservoir 30 where it is cooled and solidified by a cooling fluid 36. The flash is then cut into pieces by cutting blade 34 and carried away by cooling fluid 36 in fluid access passage 150. Fluid access passage 150 provides an inlet, an outlet and a circular path around cutting blade 34.

Figure 6:
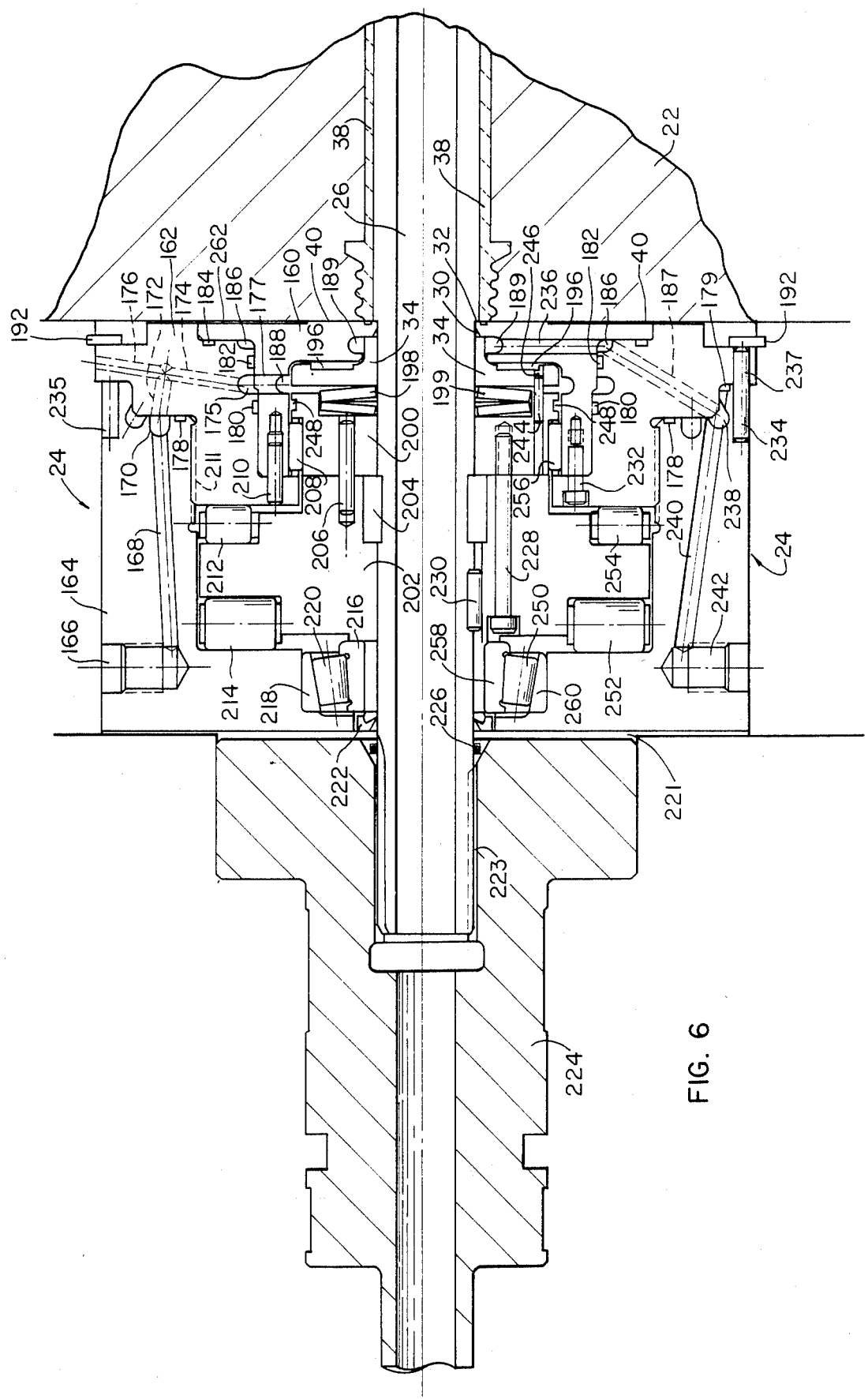
FIG. 6 is a schematic cross-sectional diagram of another embodiment of the present invention employing an axial flash gap.

FIG. 6 discloses another embodiment employing an axial flash gap. Mandrel housing 24 comprises a gap plate 160, a mandrel housing plate 162, and a mandrel housing block 164. The mandrel housing 24 forms a stationary mating interface 40 between the mandrel housing 24 and molding cavity 22. Mandrel 26 rotates in mandrel housing 24 by way of a plurality of bearings comprising tapered roller bearing 218, tapered roller bearing 250, thrust bearings 214 and 252, thrust bearings 212 and 254, radial bearings 208, 256 and thrust washer 196. Mandrel 26 is coupled to a mandrel driver 224 by a spline 223. A gap 221 is provided between mandrel driver 224 and mandrel 223 to provide clearance during rotation. An O-ring seal 226 is disposed between mandrel driver 224 and mandrel 26 to provide a water seal for water circulating in mandrel 26. Mandrel 26 is coupled to rotor 202 by split locking collar 204, drive pin 230 is inset into mandrel 26 and rotor 202 to prevent slipping of the rotor whenever mandrel 26 is rotated. Rotor 202 is coupled to locking plate 200 by way of bolts 228 which provides a preload force to hold split locking collar 204 in place. Drive pin 206 is disposed between rotor 202 and locking plate 200 and is formed of a hardened steel sufficient to withstand sheer forces. Drive pin 234 couples mandrel housing block 164 and mandrel housing plate 162. Drive pin 234 is made of a hardened steel to prevent rotation between mandrel housing plate 162 and mandrel housing block 164. Flash cutter 34 is coupled to locking plate 200 by drive pin 244 disposed in opening 246 of flash cutter 34. Spring washers 198, 199, are disposed between cutter 34 and locking plate 200 to provide a preload force on locking plate 34 in the axial direction. Bolt 232 locks mandrel housing 162 to gap plate 160 in conjunction with drive pin 210. Snap ring 192 is disposed to hold pin 234 in place.

Figure 8:
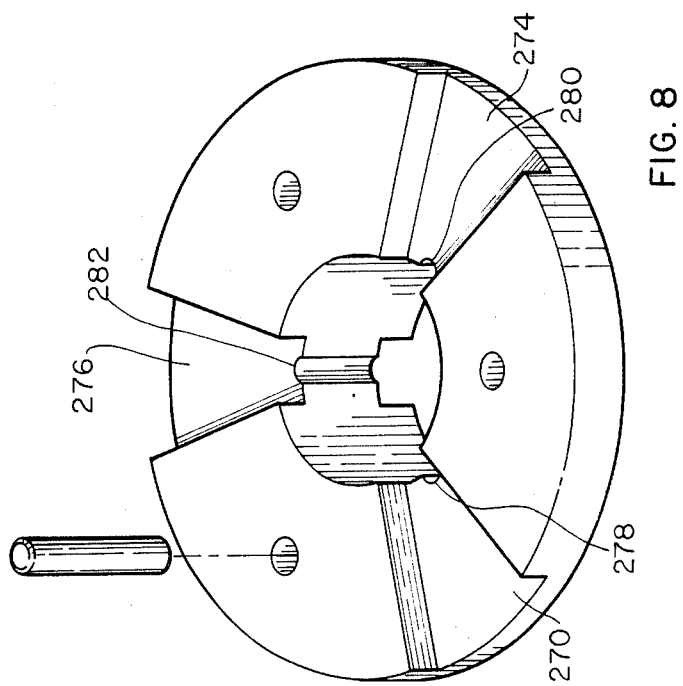
FIG. 8 is a schematic perspective view of the opposite side of the flash cutter illustrated in FIG. 7.
Figure 9:
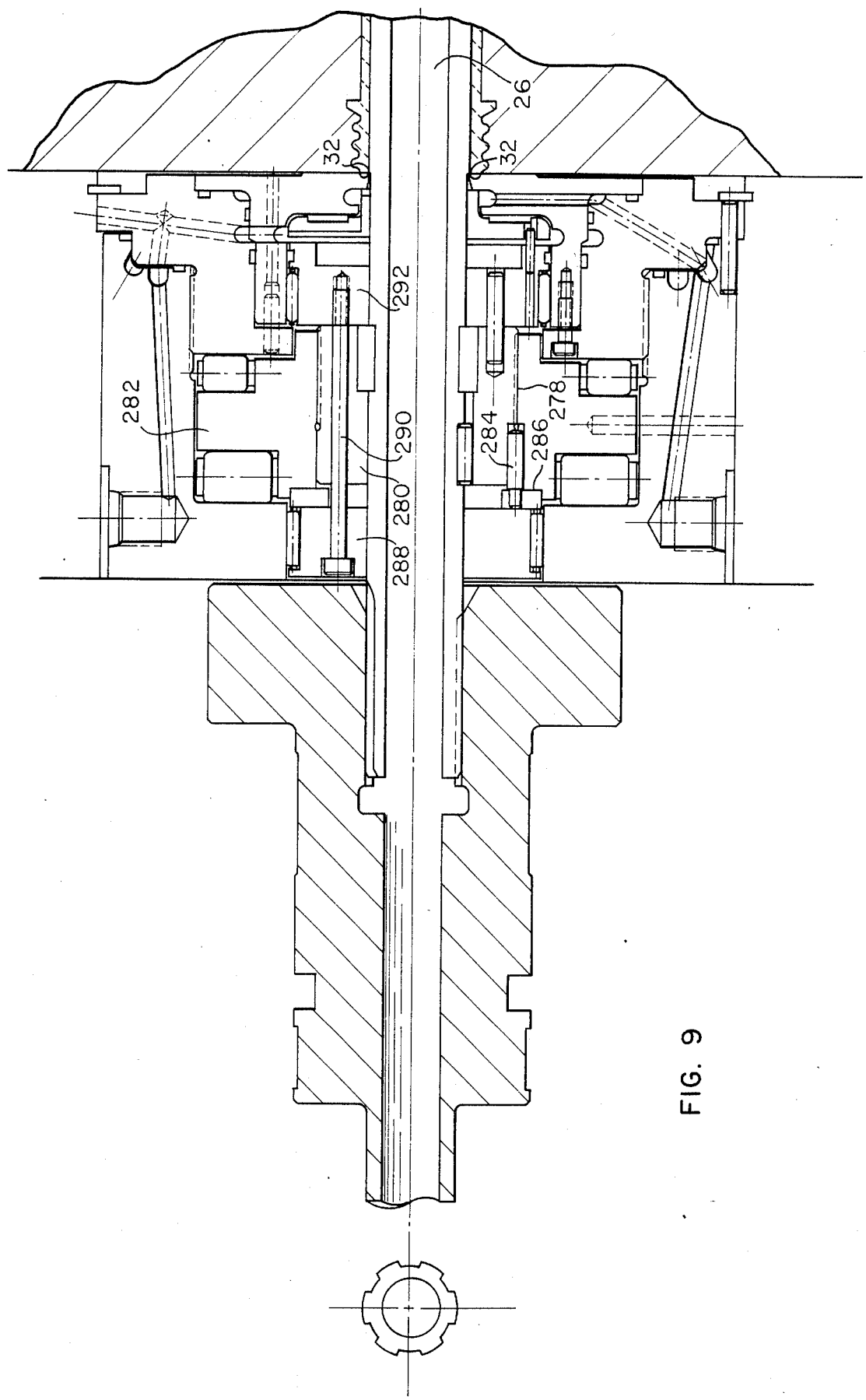
FIG. 9 is a schematic cross-sectional diagram of another embodiment of the present invention employing an axial flash gap.

Fluid inlet opening 166 is coupled to fluid channel 168 which is in turn connected to annular fluid channel 170. Annular fluid channel 170 forms an annulus in mandrel housing block 164. Fluid channel 172 in mandrel housing plate 162 couples to annular fluid channel 170, fluid channel 176 and fluid channel 174. Fluid channel 174 couples to annular fluid channel 175 formed in mandrel housing plate 162. Annular fluid channel 170 and annular channel 188 are coupled together by fluid channel 177 formed in gap plate 160. Annular fluid channel 188 is coupled to annular fluid channel 189 by various openings formed in flash cutter 34, as illustrated in FIGS. 8 and 9.

Figure 7:
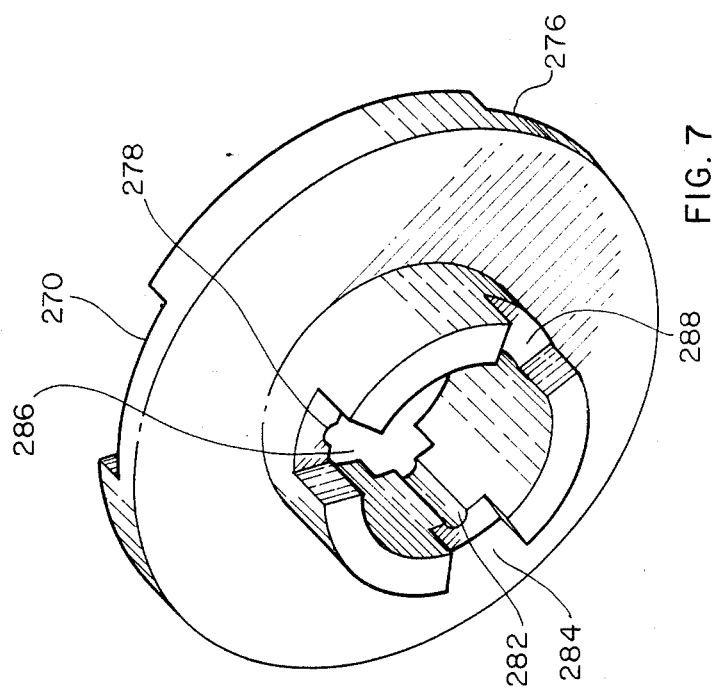
FIG. 7 is a schematic perspective view of one side of the flash cutter utilized in the embodiments of FIGS. 6 and 9.

FIG. 7 discloses a perspective end view of the flash cutter 34 of FIG. 6 from an end adjacent to spring washers 198 and 199. FIG. 8 discloses a perspective end view of flash cutter 34 of FIGS. 6 and 7 viewed from the opposite end from that shown in FIG. 7. As schematically illustrated in FIGS. 7 and 8, fluid from annular fluid channel 188 is channeled between flash cutter 34 and locking plate 200 and flows through gaps 270, 274 and 276, formed in flash cutter 34. Fluid then flows through openings 278, 280 and 282 around mandrel 26.

Fluid emitted by openings 278, 280 and 282 passes through openings 284, 286 and 288 of the flash cutter into annular fluid channel 189, as illustrated in FIG. 6. Fluid from annular fluid channel 189 passes through fluid channel 236 to annular fluid channel 186. Fluid from annular fluid channel 186 passes through fluid channel 187 to annular fluid channel 238. Fluid from annular fluid channel 238 passes through fluid channel 240 and exits through fluid outlet opening 242.

In operation, mandrel 26 is inserted in molding cavity 22 such that mandrel housing 24 abuts against molding cavity 22 to form a stationary mating interface 40 which has milled slots 262 capable of venting gases while simultaneously suppressing flash from the parison during the molding process. Flash gap 32 has a gap spacing on the order of 0.0002 to 0.0005 inches. The flash gap is connected to a reservoir 30 which is coupled to annular fluid channel 189 which flushes away flash pieces produced by flash cutter 34 in reservoir 30. Fluid is circulated under negative pressure between fluid inlet opening 166 and fluid outlet opening 242. The fluid circulates through fluid channel 168, annular fluid channel 170, fluid channel 172, fluid channel 174, annular fluid channel 175, fluid channel 177 into annular fluid channel 188. Fluid then circulates down along the back side of flash cutter 34 through openings 270, 274, 276 into openings 278, 280 and 282 formed around the surface of mandrel 26, as shown in FIGS. 6 and 7. Fluid then passes into openings 284, 286 and 288 as shown in FIG. 9, which couple directly to annular fluid channel 189 and reservoir 30, as shown in FIGS. 6 and 7. Flash particles are removed from reservoir 30 by the fluid which passes through fluid channel 236, annular fluid channel 186, fluid channel 187, annular fluid channel 238 and fluid channel 240 into fluid outlet opening 242. The fluid is circulated under negative pressure such as disclosed in the above referenced U.S. Pat. No. 4,091,069 the disclosure of which is specifically incorporated herein by reference, to insure that the fluid does not pass through flash gap 32 into the molding cavity. The fluid functions to flush out reservoir 30 and remove flash particles so that they do not become airborne and interfere with stationary mating surface 40. The fluid can comprise water, a polymer solvent or any other desired fluid. In addition to flushing out the flash pieces, the fluid also functions to freeze off the polymer so that it can be chipped away by flash cutter 34.

Additionally, the flash seal may be formed from the polymer in this embodiment and all the embodiments disclosed herein. In this case, the polymer fills flash gap 34 and at least a portion of reservoir 30 and is solidified by the cooling fluid so that the polymer ceases to flow through the flash gap. A rotary flash seal is therefore formed by the polymer material.

A series of O-rings 178, 180, 182, 184, 248, and 179 are disposed throughout the device that isolate the fluid channels described above. The O-rings also function to isolate the bearings to prevent oil or grease from traveling into the fluid channels. This allows a recirculating lubrication system to be employed in the device wherein oil is circulated around the bearings during operation. If a recirculating system is not employed, the bearings can be prepacked in grease. In this case, the O-ring seals function to prevent loss of the lubricating material during operation. Spring washers 198 and 199 function to preload flash cutter 34 in an axial direction against thrust washer 196. A gap is machined between flash cutter 34 and gap plate 160 adjacent reservoir 30. The gap is machined to ensure that the cutter sheers off polymer emitted into reservoir 30.

Locking plate 200 functions to provide a surface for spring washers 198 and 199 to apply a predetermined force on cutter 34 and also functions as a bearing retainer to insure that core pin 26 remains straight in molding cavity 22. Radial bearing 208, together with tapered bearing 220 allow the core pin to rotate in mandrel housing 24 while minimizing radial deflection of mandrel 26. A typical problem in rotary molding devices are that during the process of injection molding, injection pressures are so high that they cause the mandrel 26 to be deflected. Close tolerances are needed in the radial bearings since any play in the radial bearings will cause the mandrel 26 to shift to one side causing a non-concentric mold. When this occurs, wall thickness of the finished article will be thicker on one side than the other. Bearings 220, 250, 208 and 256 have sufficiently tight tolerances to prevent deflection of the pin during the high pressures of the injection molding process. Tapered bearings 220 and 250 are bearings which function to take up both axial and radial forces. By proper machining of rotor 202, a preload force can be placed on races 216 and 258 in a direction towards mandrel drive 224 to tighten up bearings 220 and 250 and thereby eliminate any play in the bearing. Tolerances of 0.0004 to 0.0006 are provided in radial bearings 208 and 256 to minimize deflection of mandrel 26. Tapered bearings 220 and 250 totally eliminate play because of the tapered shape of the bearings and races.

Bearings 214 and 252 comprise large thrust bearings which are capable of withstanding core pin injection pressures on the order of 20,000 to 30,000 psi which are typically encountered in the rotary injection molding process. The entire force placed on the core pin is supported by thrust bearings 214 and 252. The size of thrust bearings 214 and 252 set the location of rotor 202. Thrust bearings 212 and 254 function as preload bearings. Mandrel housing block 164 is threaded to match threads 211 of mandrel housing plate 162. Mandrel housing plate 162 and mandrel housing block 164 are assembled by screwing these units together to preload thrust bearings 212 and 254 against rotor 202. This preloads the whole system back against mandrel housing block 164 through thrust bearings 214 and 252. That holds rotor 202 in a set position.

The rotor 202 is coupled to mandrel 26 by split locking collar 204. Split locking collar 204 is a very close tolerance machine part which fits into a notch in mandrel 26. The tolerances of the notch in locking split collar 204 are so close that split locking collar 204 is packed in dry ice to shrink the split locking collar 204 to provide sufficient clearance for assembly. This provides a tight fit of rotor 202 with mandrel 26 so as to eliminate axial play of mandrel 26. Rotor 202 is bolted to locking plate 200 by a bolt 228 with a preload force designed so that there is little clearance between the final position of locking plate 200 and split locking collar 204 on rotor 202. When these elements are clamped together in this manner, they become one solid unit that cannot shift on mandrel 26. Also, drive pin 230 is placed in a recess on mandrel 26 which matches a similar recess on rotor 202 to take up any rotary torque between these items.

A predetermined, preload force is applied between mandrel housing block 164 and mandrel housing plate 162 by screwing these items together on threads 211. When this predetermined force is reached, pin 13 is inserted through one of a series of holes in mandrel housing plate 162 which is aligned with one of a series of slots, such as slot 235 formed in mandrel housing block 164. Slots 235 in mandrel housing block 164 are formed every 16° around the circumference of mandrel housing block 164 while holes, such as hole 237, are formed in mandrel housing plate 162 every 15°. In this manner, a hole 237 in a slot 235 will align for every 1° of rotation of these items so that a pin can be inserted to obtain a desired preload force for every 1° of rotation between mandrel housing plate 162 and mandrel housing block 164. The threads between mandrel housing plate 162 and mandrel housing block 164 are buttress type threads which are capable of withstanding high pressures generated by the injection molding process. One degree of rotation produces an axial displacement of approximately 0.00014 inches. Snap ring 192 is provided to hold pin 234 in place. Snap ring 92 can be quickly and easily removed for removal of pin 234 to quickly disassemble the unit. The entire cartridge can then be removed and a new cartridge inserted and thereby minimize down time in a high speed automated process.

Mandrel 26 fits into a mandrel driver 224 by a spline between the two. Torque is transmitted through the spline to rotate the mandrel 26 which in turn rotates rotor 202, locking plate 200 and flash cutter 34. The spline is used in a production tool to enable an operator to quickly change entire unit as a cartridge if some problem develops. A gap 221 is provided between mandrel housing 24 and mandrel driver 224 to prevent contact of these elements. An O-ring seal 226 is provided between mandrel 26 and mandrel driver 224 to seal cooling fluid which is circulated through mandrel 26.

The spline also allows some misalignment between mandrel housing 24 and mandrel driver 224. The drive system for mandrel driver 224 has its own bearings and since it is difficult to align more than two bearings on a shaft, a spline allows for some misalignment so that tight tolerances between the drive system of mandrel driver 224 and mandrel housing 24 are not required.

As stated previously, it is desirable to provide a flash gap having a dimension ranging from 0.0002 to 0.0005 inches between mandrel 26 and gap plate 160. Grinding of the surface of mandrel housing plate 162 which abuts against preloaded thrust bearings 212 and 254 provides a larger flash gap 32. If a smaller gap is desired, a ring shim can be inserted between gap plate 160 and mandrel housing plate 162 at a location where drive pin 210 and bolt 232 couple gap plate 160 and mandrel housing plate 162. This moves gap plate 160 in a direction towards molding cavity 22 and produces a smaller flash gap 32.

FIG. 9 discloses another embodiment of the present invention utilizing an axial gap. The embodiment illustrated in FIG. 9 is the same as the embodiment illustrated in FIG. 6 with the exception that the embodiment of FIG. 9 provides for adjustment of the flash gap 32. Since adjustment is provided by dividing the rotor 202 of FIG. 6 into two elements, i.e. rotor element 280 and rotor element 282. Rotor elements 280 and 282 are coupled together by buttressed threads which are designed to withstand large forces in the axial direction. Rotation of rotor elements 280 and 282 causes an axial displacement of 0.00014 inches per each degree of axial rotation. Adjustment of flash gap 32 is provided by rotating rotor elements 280 and 282 with respect to one another until the desired flash gap is achieved. At that point, a locking pin 284 is inserted in one of a series of slots in rotor element 280 and 282 which align with one another. The slots in rotor element 280 are disposed every 15° around its circumference. Similar slots are formed in rotor element 282 every 16° around its circumference on a matching surface with rotor element 280. Consequently, a pair of slots aligns for each degree of rotation of rotor elements 280 and 282 with respect to each other so that locking pin 284 can be inserted in a pair of aligned slots for each degree of rotation. In this manner, the flash gap 32 can be adjusted without any machining of the parts. By measuring the dimensions of flash gap 32, it can be determined how many degrees of rotation are required to provide a desired flash gap dimension since each degree of rotation either adds or subtracts approximately 0.00014 inches to the gap. This design is extremely useful in a production situation since it provides a means for easily adjusting a gap in a quick and simple manner without machining.

In order to achieve a high tolerance gap 32, threads 278 are preloaded to eliminate movement upon application of pressure to mandrel 26 during the injection molding process. Locking pin 284 is pressed into a ring 286 which abuts against preload ring 288. Bolt 290 is tightened in locking plate 292 to force rotor element 280 towards the rear of the housing. Force is transmitted through ring 286 to rotor element 282 to apply a force in the forward axial direction against rotor element 282 and provide a preload force to threads 278 to eliminate any movement between rotor elements 280 and 282 when force is applied to mandrel 26 during the injection molding process. In this manner, preloading of threads 278 ensures high tolerances for the gap dimension of flash gap 32. The amount of preload applied to threads 278 is determined by the torque applied to the series of bolts 290.

Figure 10:
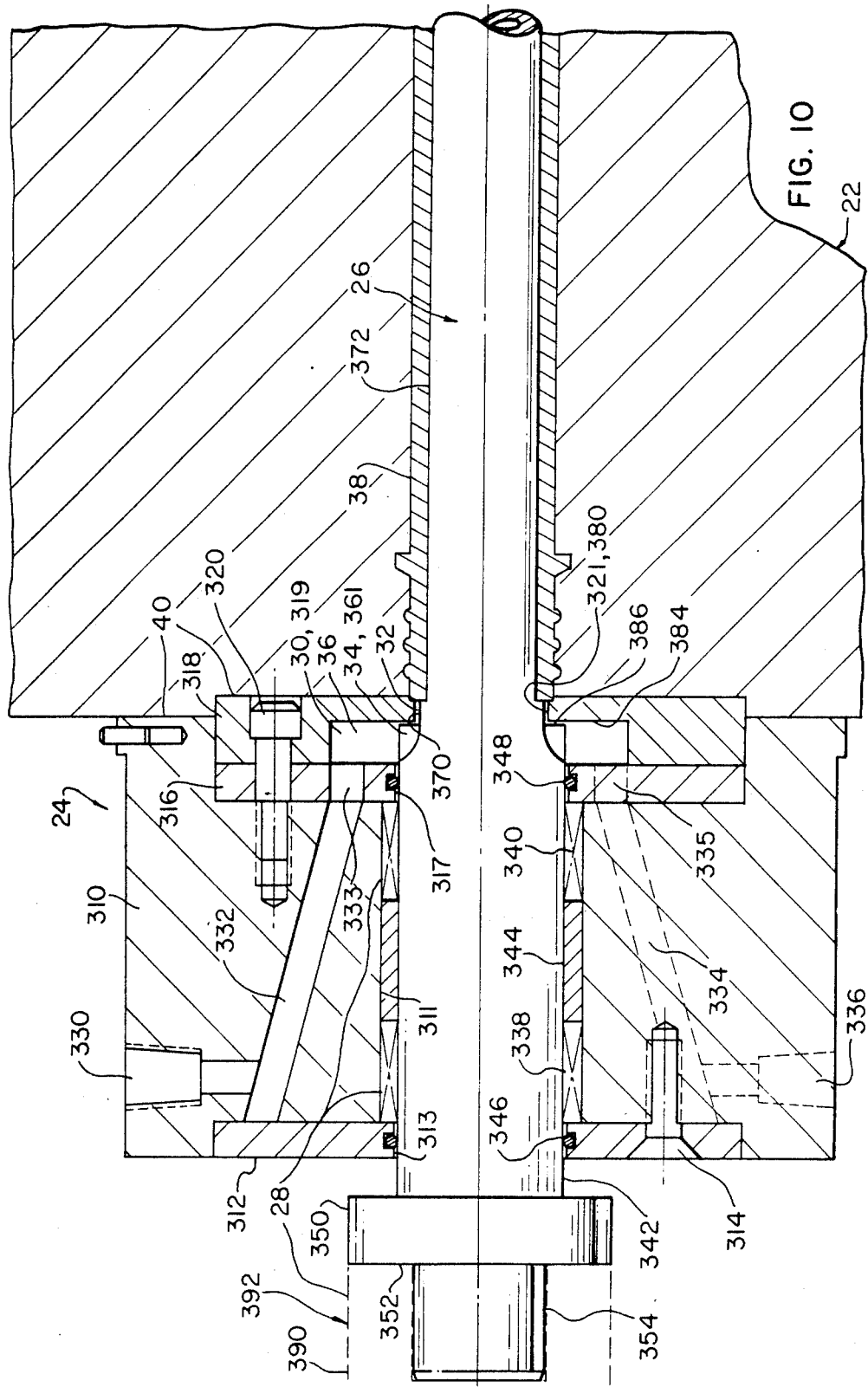
FIG. 10 is a schematic cross-sectional diagram of another embodiment of the present invention employing an axial flash gap.
Figure 11:
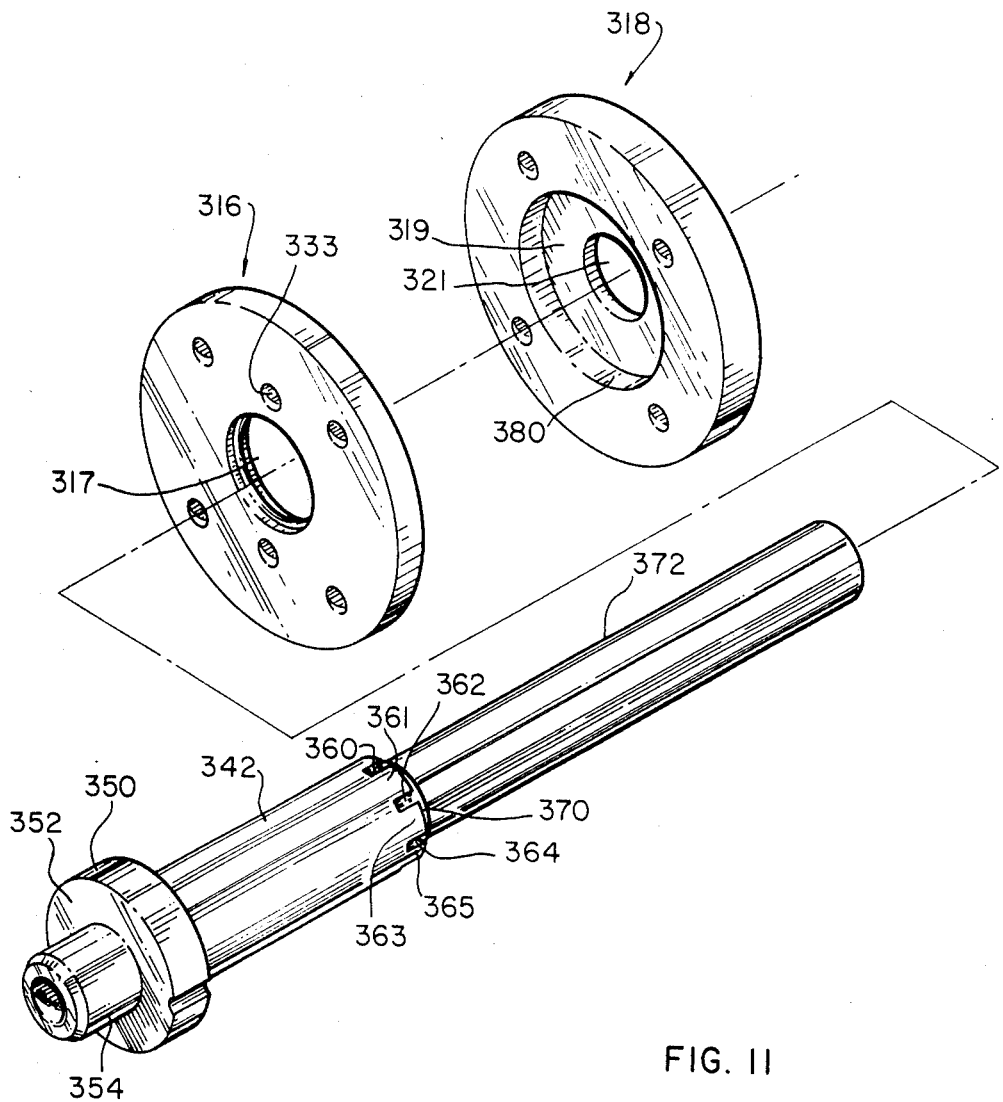
FIG. 11 is a schematic perspective view of a mandrel and two mandrel housing plates of the embodiment of FIG. 10.

FIG. 10 illustrates another embodiment of the invention, also shown partially in FIG. 11, wherein the flash gap 32 is an axial flash gap. In this embodiment the mandrel housing 24 comprises a main housing block 310 having a central bore therein for receiving the mandrel 26. A first sealing plate 312 is fixedly attached in a cut out portion on one face of housing block 310 and is fixedly secured thereto by conventional fastening means 314, such as bolts or the like. The first sealing plate 312 has a central bore 313 therein which is positioned in coaxial alignment with the central bore 311 in the mandrel housing block 310. A second sealing plate 316 is mounted in a cut out portion on an opposite side of the housing block from plate 312. Plate 316 has a central bore 317 therein positioned in coaxial alignment with the bore in the housing block 310. A third housing plate 318 is mounted with one planar face surface thereof in abutting engagement with an outer planar surface of plate 316. Both plate 316 and 318 are fixedly secured to one another and to housing block 310 by conventional fastening means 320, such as bolts. An axially extending cylindrical cavity 319 coaxial with bores 311, 313 and 317 is cut into the face surface of housing plate 318 on the face positioned adjacent to housing plate 316. This cylindrical cavity 319 receives and encompasses a portion of the mandrel 26 and defines a reservoir means 30 for receiving and discharging flash particles. A cylindrical bore 32 is positioned coaxially with cylindrical cavity 319 and extends through plate 318.

Housing block 310 comprises a fluid inlet opening 330 in one face thereof which is connected to a fluid inlet passage 332 within the block which communicates with reservoir means 30 through an inlet bore 333 in plate 316. A fluid outlet passage 334 in fluid communication with a fluid outlet opening 336 in another face of housing block 310 communicates with reservoir 30 through a fluid outlet bore 335 in plate 316.

A first precision roller bearing 338 is positioned at one axial end of bore 311 in block 310 and a second precision roller bearing 340 is positioned in the opposite axial end of bore 311. Both roller bearings 338, 340 engage an enlarged diameter mandrel portion 342 which extends through the housing block bore 311. A conventional annular packing 344 is provided between the two roller bearings. The bearings are isolated by a first O-ring 346 mounted in a groove portion of the bore 313 in mandrel sealing plate 312 and a second O-ring 348 mounted in a groove portion of the bore 317 of second mandrel sealing plate 316.

A mandrel flange portion 350 is positioned outside of the mandrel housing 24 at the end of the mandrel distal the molding cavity 22. The flange portion 350 has an outer radial surface 352 which accepts thrust loading from a thrust bearing 390 portion of a conventional rotational drive means 392. The thrust bearing 390 is received in annular torque transmitting relationship about a smaller diameter connecting portion 354 of the mandrel 26.

Mandrel axially extending groove portions 360, 362, 364, etc. are provided in equally circumferentially space relationship at one end of the mandrel enlarged diameter portion 342. The groove portions 360, 362, 364, etc. define mandrel cutter portions 361, 363, 365, etc. In one preferred embodiment, the mandrel groove portions comprise an axially length of between 0.12 inches and 0.25 inches and comprise a circumferential width of between 0.12 inches and 0.25 inches. A flash gap defining mandrel portion 370 is positioned axially next adjacent the grooved end of mandrel enlarged diameter portion 342. The flash gap defining portion 370 has a diameter smaller than that of enlarged portion 342 and slightly larger than that of the adjacent parison receiving mandrel portion 372. The interior surface 380 of mandrel housing plate 318 bore 321 is positioned in spaced radially opposite relationship with mandrel portion 370, and thus mandrel portion 370 and mandrel housing surface 380 define an axial gap 32 therebetween. An inwardly positioned radially extending surface 384 of housing plate 318 which intersects bore surface 380 is positioned a sufficient axial distance from the terminal end surface of cutter portions 361, 363, 365, etc. so as to prevent abrasive contact therewith.

Typical operating parameters and dimensions for the apparatus illustrated in FIGS. 10 and 11 may be as follows:

1. The small diameter portion 372 of the mandrel has a diameter between 0.90 inches and 0.75 inches and an axial length between 7.00 inches and 3.50 inches.

2. The ratio of diameters of the mandrel small diameter portion 372 to the mandrel intermediate diameter portion 370 is between 1.0 and 1.25.

3. The ratio of diameters of the small diameter portion 372 and the enlarged diameter portion 342 is between 1.5 and 2.5.

4. The axial distance between the flash gap 32 and the radially extending terminal surface of said mandrel enlarged diameter portion 342 is between 0.02 inches and 0.06 inches.

5. The axial length of the flash gap 32 is between 18 inches and 0.25 inches.

6. The average radial dimension of the flash gap 32 is between 0.0002 inches and 0.0008 inches.

7. The forming pressure of the parison 38 forming material is between 15,000 psi and 20,000 psi.

8. The average parison 38 wall thickness is between 0.06 inches and 0.160 inches.

9. During formation of the parison 38, the mandrel 26 rotates at an average speed of between 200 rpm and 350 rpm.

10. The molecular weight MC (the weight average molecular weight) of the material forming the parison 38 at injection temperature is between 35,000 and 400,000, which includes substantially all forms of polystyrene.

In operation, mandrel 26 is inserted into the molding cavity 22. Mandrel housing 24 and molding cavity 22 provide a stationary mating interface 40 which is capable of venting gases during the molding process while simultaneously supressing flash. Mandrel 26 is maintained in relatively fixed radial position relative mandrel housing 24 by precision roller bearings 338, 340. A precise flash gap distance is provided by accurate machining of mandrel surface 370 and mandrel housing plate bore surface 380. The axial position of mandrel 26 within housing 24 and molding cavity 22 is determined by the axial position of thrust bearing 390 which is coupled to mandrel end portion 354 in abutting engagement with radial surface 352. Mandrel cutter portions 361, 363, 365, etc. cut any flash transmitted through flash gap 32 into small flash particles which are carried away by fluid 36 flowing through reservoir 30. The fluid 36 may comprise pressurized air, water under negative pressure or other fluids.

The present invention, therefore, provides a system which substantially reduces the possibility of contamination from flash particles produced during a molding process of a rotary injection molding machine and thereby provides a commercially usable rotary injection molding system. This is accomplished by using a non-rotating mating interface which is capable of venting gases produced during the molding process while simultaneously suppressing flash. Rotation of the mandrel is provided between a mandrel housing and the mandrel so that the non-rotating mating interface can be provided between the mandrel housing and cavity mold. A flash gap is consequently formed between the rotating mandrel and mandrel housing so that flash particles are directed away from the mating interface and contained in a reservoir which is totally separate from the mating interface. A cooling fluid is also utilized to remove the flash particles contained in the reservoir to thereby substantially reduce the possibility for contamination of the mating interface by flash and flash particles and to allow the rotary molding system to maintain proper tolerances and thereby provide a commercially usable rotary injection molding system.

The foregoing description of the invention has been presented for purposes of illustration and description. It is not intended to be exhaustive or to limit the invention to the precise form disclosed, and other modifications and variations may be possible in light of the above teachings. For example, the flash gap may be disposed along any portion of the parison lip as long as flash is directed away from the mating interface and contained in a reservoir which is physically separated from the mating interface. The embodiment was chosen and described in order to best explain the principles of the invention and practical application of the invention to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A system for preventing flash buildup on mating surfaces of a rotary molding machine comprising:

mandrel housing means having a first mating interface;

mandrel means rotatably supported by said mandrel housing means;

molding cavity means for forming a second mating surface in said molding enclosure and having a second mating surface which is adapted to abut with said first mating surface of said mandrel housing means to form a stationary mating interface therebetween which is capable of venting gases and suppressing flash during injection molding;

coupling means for providing relative rotation between said mandrel means and said mandrel housing means and a predetermined separation therebetween which functions as a flash gap;

reservoir means disposed between said mandrel means and said mandrel housing means for receiving and containing flash emitted by said flash gap.

2. The system of claim 1 further comprising cooling fluid means circulated under negative pressure in said reservoir for solidifying polymer in said flash gap and removing flash particles from said reservoir.

3. The device of claim 1 wherein said flash gap comprises a radial gap between said mandrel and said mandrel housing.

4. The device of claim 1 wherein said flash gap comprises an axial gap between said mandrel and said mandrel housing.

5. A device for suppression and removal of flash formed in a rotary molding machine comprising:

a mandrel;

a mandrel housing;

a molding cavity adapted to abut against said mandrel housing to form a stationary mating interface capable of venting gases and suppressing flash;

coupling means for providing relative rotation between said mandrel and said mandrel housing to provide for relative rotation between said mandrel and said mandrel housing and a predetermined separation therebetween which functions as a flash gap;

reservoir means disposed between said mandrel and said mandrel housing means for receiving and containing flash emitted by said flash gap;

means for removing flash from said reservoir means.

6. The device of claim 5 wherein said flash gap comprises a radial gap between said mandrel and said mandrel housing.

7. The device of claim 5 wherein said flash gap comprises an axial gap between said mandrel and said mandrel housing.

8. The device of claim 5 wherein said coupling means further comprises means for providing a flash gap having a spacing which is independent of thrust applied to said stationary mating interface during molding.

9. A system for averting the flow of flash material between mating surfaces of a rotary molding machine and containing and removing flash particles comprising:
  mandrel housing means having a first mating surface;
  mandrel means rotatably supported by said mandrel housing means;
  coupling means for providing relative rotation between said mandrel means and said mandrel housing means to allow relative rotation between said mandrel and said mandrel housing and a predetermined separation therebetween so as to form a flash gap which is disposed radially inward from said parison;
  molding cavity means having a second mating surface adapted to abut against said first mating surface of said mandrel housing means to form a stationary mating interface between said molding cavity means and said mandrel housing, said stationary mating interface disposed radially outward from said parison and having machined gaps formed therein capable of venting gases and suppressing flash during molding;
  reservoir means disposed between said mandrel and said mandrel housing for receiving and containing flash emitted by said flash gap;
  cooling fluid means circulated under negative pressure in said reservoir means to solidify and carry away flash material emitted from said flash gap to prevent said flash material from depositing on said first and second mating surfaces whenever said first and second mating surfaces are separated.

10. The system of claim 9 wherein said coupling means further comprises means for providing a flash gap having a radial spacing between said mandrel and said mandrel housing.

11. The system of claim 9 wherein said means for coupling further comprises means for providing a flash gap having an axial spacing between said mandrel and said mandrel housing.

12. The system of claim 9 wherein said means for coupling further comprises means for providing a flash gap having a spacing which is independent of thrust applied to said stationary mating interface during molding.

13. The system of claim 9 wherein said flash gap forms a rotary flash seal which is capable of preventing the flow of polymer.

14. A system for preventing the buildup of flash material on mating surfaces of a rotary molding machine for forming a plastic parison comprising:
  a mandrel;
  mandrel housing means for rotatably supporting said mandrel;
  molding cavity means adapted to abut against said mandrel housing to form a stationary mating interface between said molding cavity and said mandrel housing, said mating interface disposed radially outward from said parison and having machined gaps to vent gas during molding;
  coupling means for providing relative rotation between said mandrel and said mandrel housing means and a predetermined separation therebetween which functions as a flash gap between said mandrel and said mandrel housing means, said flash gap disposed radially inward from said parison;
  reservoir means formed between said rotating mandrel and said mandrel housing means, said reservoir means disposed radially inward from said parison and coupled to said flash gap such that flash emitted during injection molding of said parison through said flash gap is directed away from said mating interface and enclosed between said rotating mandrel and said mandrel housing;
  cooling fluid means circulating in said reservoir means under negative pressure to solidify said flash emitted by said parison through said flash gap and carry away flash particles in said reservoir to prevent flash from depositing on said stationary mating interface.

15. The device of claim 14 wherein said coupling means further comprises means for providing a flash gap having a radial spacing between said mandrel and said mandrel housing.

16. The device of claim 14 wherein said coupling means further comprises means for providing a flash gap having an axial gap between said mandrel and said mandrel housing.

17. The device of claim 14 wherein said coupling means further comprises means for providing a flash gap having a spacing which is independent of thrust applied during molding to said stationary mating surface.

18. The device of claim 14 wherein said cooling fluid means comprises water.

19. The device of claim 14 wherein said cooling fluid means comprises a polymer solvent.

20. A method of preventing buildup of flash material on mating surfaces of a rotary molding machine for forming a parison comprising the steps of:
  coupling a mandrel and a mandrel housing to form a flash gap and provide relative rotation between a mandrel and a mandrel housing;
  providing a stationary mating interface between said mandrel housing and a molding cavity which is capable of venting gases and suppressing flash from said parison;
  containing flash emitted from said flash gap in a reservoir between said mandrel and said mandrel housing;
  removing flash contained in said reservoir using a fluid.

21. The method of claim 20 comprising the further steps of:
  solidifying flash emitted by said flash gap using a cooling fluid in said reservoir;
  cutting solidified flash into flash particles for removal by said cooling fluid.

22. A system for suppression of flash formed in a rotary molding machine comprising:
  a mandrel;
  mandrel housing means for supporting said mandrel;
  molding cavity means adapted to abut against said mandrel housing to form a stationary mating interface capable of venting gases and suppressing flash;
  coupling means for providing relative rotation between said mandrel and said mandrel housing means and a predetermined separation therebetween which functions as a rotary flash seal;
  reservoir means disposed between said mandrel and said mandrel housing for receiving and containing flash emitted by said flash gap;
  cooling fluid means circulated under negative pressure in said reservoir to solidify polymer in said rotary flash seal to prevent the flow of polymer through said rotary flash seal.

23. The device of claim 22 wherein said rotary flash seal comprises a radial gap between said mandrel and said mandrel housing.

24. The device of claim 22 wherein said rotary flash seal comprises an axial gap between said mandrel and said mandrel housing.

25. A system for preventing the buildup of flash material on mating surfaces of a rotary molding machine for forming a plastic parison comprising:
 a mandrel;
 mandrel housing means for rotatably supporting said mandrel;
 molding cavity means adapted to abut against said mandrel housing to form a stationary mating interface between said molding cavity and said mandrel housing, said mating interface disposed radially outward from said parison and having machined gaps to vent gas during molding;
 coupling means for providing relative rotation between said mandrel and said mandrel housing means and for providing a predetermined axial separation therebetween which functions as a flash gap between said mandrel and said mandrel housing means, said flash gap disposed radially inward from said parison;
 reservoir means formed between said rotating mandrel and said mandrel housing means, said reservoir means disposed radially inward from said parison and coupled to said flash gap such that flash emitted during injection molding of said parison through said flash gap is directed away from said mating interface and enclosed between said rotating mandrel and said mandrel housing;
 flash cutter means disposed within said reservoir means for cutting flash emitted from said flash gap into flash particles;
 fluid means flowing through said reservoir means for carrying away flash particles in said reservoir to prevent flash from depositing on said stationary mating interface.

26. The invention of claim 25 wherein said flash cutter means comprises a grooved surface portion of said mandrel.

27. The invention of claim 26 wherein said grooved surface portion of said mandrel comprises an enlarged diameter portion of said mandrel.

28. The invention of claim 27 wherein said enlarged diameter portion of said mandrel terminates in a radially extending surface positioned a predetermined axial distance from said flash gap.

29. The invention of claim 28 wherein said predetermined axial distance between said flash gap and said radially extending terminal surface of said mandrel enlarged diameter portion comprises a distance between 0.02 inches and 0.06 inches.

30. The invention of claim 28 wherein said mandrel comprises a small diameter portion for forming the parison thereabout wherein the ratio of diameter of said mandrel small diameter portion and said mandrel enlarged diameter portion is between 1.0 and 1.25.

31. The invention of claim 30 wherein a portion of said mandrel defining said flash gap comprises an intermediate diameter portion wherein the ratio of diameter of said small diameter portion and said intermediate diameter portion is between 1.5 and 2.5.

32. The invention of claim 28 wherein the axial length of said flash gap is between 0.18 inches and 0.25 inches.

33. The invention of claim 26 wherein the average radial dimension of said flash gap is between 0.0002 inches and 0.0008 inches.

34. The invention of claim 25 wherein said fluid means comprises air.

35. The invention of claim 25 wherein said fluid means comprises a cooling liquid under negative pressure.

36. The invention of claim 25 wherein said coupling means comprises a pair of precision roller bearings operably engaging portions of said mandrel positioned within said mandrel housing.

37. The invention of claim 36 wherein said coupling means further comprises axial thrust transmitting means for positioning said mandrel in a predetermined axial position within said mandrel housing positioned in engaging contact with a radially extending surface portion of said mandrel.

38. The invention of claim 37 wherein said axial thrust transmitting means comprises a thrust bearing portion of a drive means for rotating said mandrel.

39. The invention of any one of claims 25-38 wherein the parison forming material is polystyrene; and wherein the forming pressure of the parison forming material is between 15,000 psi and 20,000 psi; and wherein the average parison wall thickness is between 0.60 inches and 0.160 inches; and wherein during formation of the parison, the mandrel rotates at an average speed of between 200 rpm and 350 rpm; and wherein the material forming the parison is injected at a temperature range between 370° and 450° F.

* * * * *